(12) United States Patent
Althouse et al.

(10) Patent No.: US 6,993,257 B2
(45) Date of Patent: Jan. 31, 2006

(54) OPTICAL CHANNEL MONITOR UTILIZING MULTIPLE FABRY-PEROT FILTER PASS-BANDS

(75) Inventors: Bryan L. Althouse, Davidsonville, MD (US); Gregg A. Johnson, Fairfax, VA (US)

(73) Assignee: Broadband Royalty Corporation, Wilmington, DE (US)

( * ) Notice: Subject to any disclaimer, the term of this patent is extended or adjusted under 35 U.S.C. 154(b) by 816 days.

(21) Appl. No.: 09/929,339

(22) Filed: Aug. 15, 2001

(65) Prior Publication Data

US 2003/0035163 A1 Feb. 20, 2003

(51) Int. Cl.
*H04B 10/08* (2006.01)

(52) U.S. Cl. .......................... 398/34; 398/95; 398/196
(58) Field of Classification Search ................. 398/95, 398/196, 34, 93, 195
See application file for complete search history.

(56) References Cited

U.S. PATENT DOCUMENTS

| | | | |
|---|---|---|---|
| 4,589,285 A | 5/1986 | Savit | 73/655 |
| 5,022,730 A | 6/1991 | Cimini et al. | 385/27 |
| 5,208,819 A | 5/1993 | Huber | 372/32 |
| 5,380,995 A | 1/1995 | Udd et al. | 250/227.18 |
| 5,392,117 A | 2/1995 | Belleville et al. | 356/480 |
| 5,394,415 A | 2/1995 | Zucker et al. | 372/26 |
| 5,397,891 A | 3/1995 | Udd et al. | 250/227.18 |
| 5,401,956 A | 3/1995 | Dunphy et al. | 250/227.18 |
| 5,430,574 A | 7/1995 | Tehrani | 359/378 |
| 5,591,965 A | 1/1997 | Udd | 250/227.18 |
| 5,673,129 A | 9/1997 | Mizrahi | 398/95 |
| 5,680,489 A | 10/1997 | Kersey | 385/12 |
| 5,691,989 A | 11/1997 | Rakuljic et al. | 372/20 |
| 5,706,301 A | 1/1998 | Lagerström | 372/32 |
| 5,780,843 A | 7/1998 | Cliché et al. | 250/226 |
| 5,818,585 A | 10/1998 | Davis et al. | 356/477 |
| 5,825,792 A | 10/1998 | Villeneuve et al. | 372/32 |
| 5,838,437 A | 11/1998 | Miller et al. | 356/478 |
| 5,889,901 A | 3/1999 | Anderson et al. | 385/12 |
| 5,892,582 A | 4/1999 | Bao et al. | 356/519 |
| 5,915,052 A | 6/1999 | Ball | 388/24 |
| 5,956,355 A | 9/1999 | Swanson et al. | 372/20 |
| 5,963,567 A | 10/1999 | Veselka et al. | 372/21 |
| 5,982,962 A | 11/1999 | Koops et al. | 385/37 |

(Continued)

FOREIGN PATENT DOCUMENTS

EP 0 773 640 A2 5/1997

(Continued)

OTHER PUBLICATIONS

U.S. Appl. No. 09/808,222, filed Mar. 15, 2001, Johnson.

*Primary Examiner*—Christina Y Leung
(74) *Attorney, Agent, or Firm*—Oblon, Spivak, McClelland, Maier & Neustadt, P.C.

(57) ABSTRACT

An optical channel monitor is described, the optical channel monitor includes an optical input port, a photodetector disposed in an optical path communicating at least intermittently with the optical input port, an optical filter disposed in the optical path between the optical input port and the photodetector, and an optical band splitter disposed in the optical path between the optical filter and the photodetector. The optical filter is a multibandpass filter, such as a scanning Fabry-Perot filter. The optical channel monitor also comprises a reference light system for providing a calibration standard against which an optical signal input through the input port may be compared. The channel monitor finds application in optical transmission systems including wavelength division multiplexed (WDM) optical communication systems.

35 Claims, 7 Drawing Sheets

U.S. PATENT DOCUMENTS

| | | | |
|---|---|---|---|
| 5,987,197 A | 11/1999 | Kersey | 385/24 |
| 5,991,476 A | 11/1999 | Baney et al. | 385/16 |
| 5,995,255 A | 11/1999 | Giles | 398/34 |
| 6,008,920 A | 12/1999 | Hendrix | 398/79 |
| 6,044,189 A | 3/2000 | Miller | 385/37 |
| 6,072,567 A | 6/2000 | Sapack | 356/32 |
| 6,097,487 A | 8/2000 | Kringlebotn et al. | 356/450 |
| 6,111,681 A | 8/2000 | Mizrahi et al. | 398/196 |
| 6,115,122 A | 9/2000 | Bao et al. | 356/480 |
| 6,118,530 A | 9/2000 | Bouevitch et al. | 356/308 |
| 6,134,003 A | 10/2000 | Tearney et al. | 356/479 |
| 6,188,499 B1 | 2/2001 | Majima | |
| 6,249,365 B1 | 6/2001 | Mizrahi et al. | 398/9 |
| 6,262,822 B1 | 7/2001 | Obhi et al. | 398/9 |
| 6,310,703 B1 * | 10/2001 | Alavie et al. | 398/34 |
| 6,744,793 B2 * | 6/2004 | Stoner et al. | 372/32 |
| 6,771,905 B1 * | 8/2004 | Bortz | 398/45 |
| 6,816,515 B1 * | 11/2004 | Yun et al. | 372/18 |

FOREIGN PATENT DOCUMENTS

| | | |
|---|---|---|
| WO | WO 00/13350 | 3/2000 |
| WO | WO 00/41351 | 7/2000 |

* cited by examiner

OPTICAL CHANNEL MONITOR UTILIZING MULTIPLE FABRY-PEROT FILTER PASS-BANDS

BACKGROUND

1. Field of Invention

This invention relates generally to methods and devices for measuring characteristics of an optical signal. More particularly, it relates to devices and methods for determining wavelengths of a plurality of optical communication signals.

2. Discussion of Related Art

Optical communication systems are growing with the growing demand for faster and broadband reliable networks. Wavelength division multiplexing (WDM) is one technique used to increase the capacity of optical communication systems. Such optical communication systems include, but are not limited to, telecommunication systems, cable television systems (CATV), and local area networks (LANs). An introduction to the field of Optical communications can be found in "Optical Communication Systems" by Gowar, ed. Prentice Hall, NY, 1993.

In WDM systems as well as other types of optical communication systems, it may become necessary to monitor each transmitted channel in order to determine the wavelength and power of each channel and to determine the optical noise intensity near each source wavelength. Such monitoring becomes increasingly important as one increases the number of wavelength channels transmitted through the fiber. The information produced by the channel monitor may be used for feedback control of the light source or sources, to control signal quality during environmental changes and reconfiguration of the system, to monitor instability in various components of the system, or to ensure that a selected channel is the correct one.

A limited form of wavelength monitoring is disclosed by Villeneuve et al in U.S. Pat. No. 5,825,792. Villeneuve et al disclose the use of a Fabry-Perot (FP) filter disposed within an optical path of the signal to be measured. The FP filter is positioned at an angle so that different wavelengths of light are transmitted at varying angles with respect to the incident light. A pair of photodiodes is used to provide an electric signal for feedback control of the light source.

Another approach is disclosed by Mizrahi et al in U.S. Pat. No. 6,111,681. Mizrahi et al teach a method and apparatus for providing a stabilized optical selector. The device in U.S. Pat. No. 6,111,681 correlates a wavelength selector to a wavelength emitted by an optical transmission source. The optical transmitter includes a wavelength reference which is coupled to a feedback loop. The feedback loop uses thermal control to adjust the output of the transmitter. A tap in the transmission line diverts a portion of the transmitter's energy to a wavelength reference, such a Bragg grating. A photodiode detects light transmitted through the Bragg Grating and provides a feedback signal to a microprocessor which directs the thermal control of the transmitter. Mizrahi et al. likewise disclose the reverse device, providing a feedback loop for the thermal strain control of the reflection wavelength of the Bragg grating, using the laser source as a reference.

Davis et al in U.S. Pat. No. 5,818,585 disclose a system for monitoring the reflected wavelengths from multiple strings of fiber Bragg gratings (FBG) using a scanning optical filter and an isolated duplicate reference string of FBG elements. As in the case of Mizrahi et al., the reference does not provide an absolute measurement since the FBG references themselves have a dependence on physical parameters such as temperature and strain which may vary over time.

SUMMARY OF INVENTION

The present invention provides methods and devices for monitoring optical signals and methods for calibrating the devices.

One aspect of the present invention is to provide an optical channel monitor, including: an optical input port, a photodetector disposed in an optical path communicating at least intermittently with the optical input port, an optical filter disposed in the optical path between the optical input port and the photodetector, and an optical band splitter disposed in the optical path between the optical filter and the photodetector.

In one embodiment, the optical filter is a multibandpass filter, such as but not limited to, a scanning Fabry-Perot filter.

In another embodiment, the optical channel monitor further comprise a second photodetector in optical communication with the optical band splitter. The optical band splitter directs light received in one wavelength band to the first mentioned photodetector and directs light received in a second wavelength band to the second photodetector.

In another embodiment, the channel monitor according of the present invention, further comprises an optical switch. The optical switch is disposed in the optical path between the optical filter and the optical input port.

In another embodiment, the optical channel monitor further comprises an optical reference system in optical communication with the optical switch. This optical switch is constructed and arranged to selectively break and close the optical path between the optical input port and the optical filter, and to beak and close a reference optical path between the optical reference system and the optical filter.

In one embodiment the optical reference system comprises a broadband optical source and a reference gas cell disposed between the broadband source and the optical switch.

In an alternative embodiment, the optical channel monitor further comprises a second optical band splitter disposed in the optical path between the optical input port and the optical filter. The optical reference system is in optical communication with the first mentioned optical band splitter between the photodetector and the optical filter.

In an alternative embodiment, the optical channel monitor further comprises a second photodetector in optical communication with the second optical band splitter.

Another aspect of the present invention is to provide, a method of measuring characteristics of an optical signal, including: filtering a reference beam of light with a tunable multibandpass filter, redirecting portions of the filtered reference beam of light to a first photodetector to produce a reference signal, filtering at least a portion of an optical signal with the tunable multibandpass filter, redirecting portions of the filtered portion of the optical signal to a second photodetector to produce a measurement signal, and determining characteristics of the measurement signal based on a comparison with the reference signal.

Still another aspect of the present invention is to provide a method of measuring characteristics of an optical signal, including: filtering a reference beam of light with a tunable multibandpass filter, redirecting portions of the filtered reference beam of light to a first photodetector to produce a reference signal, filtering at least a portion of an optical signal with the tunable multibandpass filter, redirecting portions of the filtered portion of the optical signal to a second photodetector to produce a measurement signal; and determining characteristics of the measurement signal based on comparison with the reference signal.

BRIEF DESCRIPTION OF THE DRAWINGS

These and other objects and advantages of the invention will become more apparent and more readily appreciated from the following detailed description of the presently preferred exemplary embodiments of the invention, taken in conjunction with the accompanying drawings, of which.

DETAILED DESCRIPTION OF PREFERRED EMBODIMENT

In the following description, for purposes of explanation and not limitation, specific details are set forth such as particular optical and electrical circuits, circuit components, techniques, etc. in order to facilitate a thorough understanding of the present invention. However, the invention may be practiced in other embodiments that depart from these specific details. The terms optical and light are used in a broad sense in this description to include both visible and non-visible regions of the electromagnetic spectrum. Currently, infrared light is used extensively in transmitting signals in optical communications systems. Infrared light is included within the broad meaning of the term light as used herein.

Examples of optical channel monitors are disclosed in a pending application entitled "Optical Channel Monitor With Continuous Gas Cell Calibration" application. Ser. No. 09/808,222 filed on Mar. 15, 2001, the entire content of which is incorporated herein by reference.

Figure 1:
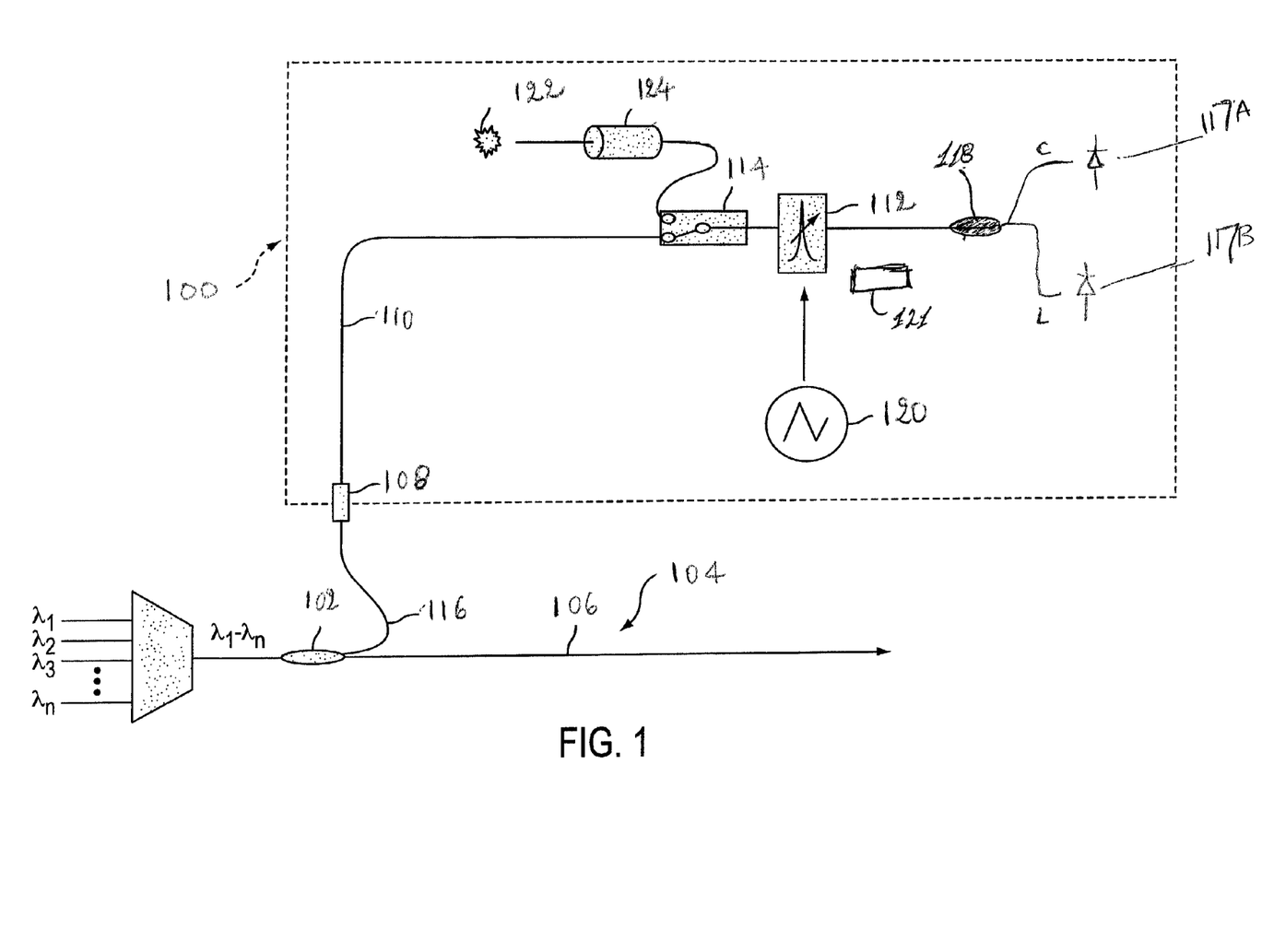
FIG. 1 is a schematic representation of an optical channel monitor according to an embodiment of the present invention.

FIG. 1 shows a portion of a WDM system that includes an optical channel monitor 100 according to an embodiment of the present invention. The optical channel monitor 100 is in optical communication with an optical communication system 104 that is adapted to carry optical signals modulated on a carrier of at least one carrier wavelength. More generally, the optical communication system 104 transmits a plurality of channels $ch_1 \ldots ch_n$ at corresponding wavelengths $\lambda_1 \ldots \lambda_n$ which are combined to form the WDM optical signal. Though in practice a channel will generally have a width, and thus occupy a wavelength range rather than a specific wavelength, for the purposes of this description, each channel will be referred to in terms of a single wavelength. The wavelength of a channel may be considered to be a central wavelength of a range, or any selected wavelength within the range occupied by the channel.

The optical communication system 104 has an optical fiber 106, that carries the WDM signal, which in long-haul WDM systems will generally be a single mode optical fiber. A coupler 102 redirects a portion of the energy from the optical fiber 106 into the optical channel monitor 100 through optical input 108 to provide an input optical signal of the optical channel monitor 100.

A tap coupler or splitter are suitable to use for the coupler 102. 1%–5% of the signal is adequate, though more, or less, light may be diverted if desired.

The optical channel monitor 100 has an optical path 110 between the optical input 108 and a multibandpass optical filter 112 that is intercepted by a switch 114. An optical fiber having an end spliced to another optical fiber 116 is suitable for providing an optical input 108 and an optical path 110 to the multibandpass optical filter 112 through switch 114. Other optical paths 110 and optical inputs 108 may include non-fiber waveguides or free space arrangements of optical components such as mirrors and/or prisms and lenses, without departing from the general scope of the invention.

The multibandpass filter 112 allows a selected wavelength band from the input optical signal to pass through. In the embodiment illustrated in FIG. 1, the multibandpass filter 112 is a scanning tunable optical filter. For example, a scanning Fabry-Perot filter is suitable. The filtered optical signal is detected by either of the photodetectors 117A or 117B.

The tunable optical multibandpass filter 112 may be tuned by providing an electromechanical system to vary the spacing between the reflecting surfaces of a Fabry-Perot resonator. The optical multibandpass filter 112, capable of scanning multiple pass bands, is scanned over a wavelength range of interest, for example, over a range of frequencies that spans all anticipated optical wavelength channels used by the optical communication system 104.

Within the total wavelength range over which the passbands of the filter 112 is scanned there may be several wavelength bands which do not overlap with any of the channels $ch_1$ to $ch_n$. Likewise, there may be one or more of the channels which is not active at a given moment. For example, the filter 112 may be used to scan two passbands to monitor any of two adjacent bands among the three bands C, L and S. One of the two adjacent bands scanned may or may not be present in the optical system 104.

The channel monitor 100 includes band splitter 118 to separate the two passbands scanned by filter 112. The band splitter 118 redirects the light, or a portion of the light to one of two outputs depending on the wavelength of the light. Each of the two passbands is independently detected by photodetector 117A or 117B. For example photodetector 117A may detect wavelengths in the C band while photodetector 117B may detect the L band.

When the multibandpass filter 112 is tuned to a wavelength band, for example in the C band, that overlaps with an active channel, the photodetector 117A will produce an output signal indicating the strength of the light detected. As the filter is scanned across a wavelength range in the C band, the photodetector 117A output will indicate a peak at the wavelength of the active channel.

One method of scanning the optical filter 112 across wavelengths is to provide a triangle wave oscillator 120 or a ramp voltage source which produces a control signal. As the voltage of the control signal is increased, the wavelength passed by the filter also increases. Other methods of scanning are within the scope and spirit of the present invention.

Moreover, the filter 112 need not necessarily be a scanning filter. Any tunable filter may be employed, provided it can be set to pass a single channel, in a signal band region such as C, L or S bands, at a given time. Likewise, an array of fixed filters could be employed rather than a tunable filter or a scanning filter. A wavelength range currently of interest is about 1525 nm to about 1565 nm, due to its current importance in existing optical communications systems. However, the broader scope of the invention is not limited to such a range of wavelengths.

In order to ensure that only a single channel in a band region is monitored at a time, the passband width of the filter 112 should be more narrow than the bandwidth between channels and broad enough to detect the channel. At current levels of system performance, a bandwidth of about 20 pm to about 200 pm is appropriate. As systems become more densely packed with channels, the bandwidth of the filter 112 should be selected accordingly.

Figure 2:
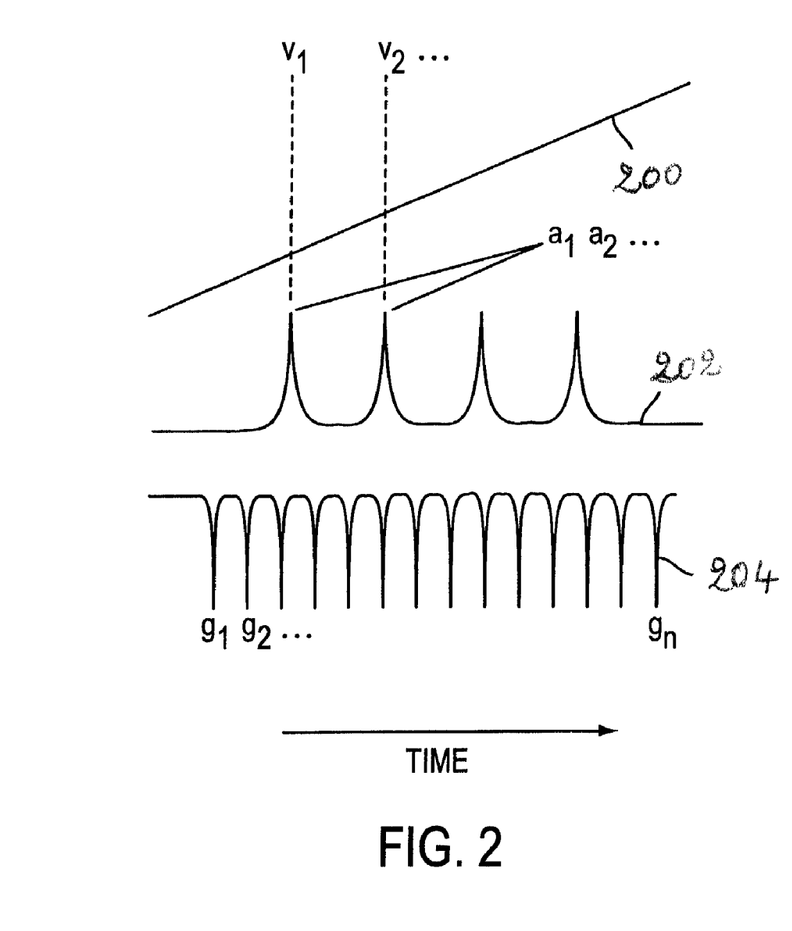
FIG. 2 is a trace showing an example of an output signal of an optical channel monitor according to the embodiment of FIG. 1.

The two top traces 200, 202 shown in FIG. 2 illustrate the relationship between the drive voltage 200 of the scanning Fabry-Perot filter 112 and the photodetector response 202 to the filtered input optical signal, at one of the photodetectors 117A or 117B. The measured values of drive voltage versus photodetector measurements of the filtered input optical signal together can be used to generate a curve indicating the relative wavelengths of detected channels. Further, information about the relative power of each channel can be extracted. In the example traces 200, 202 of FIG. 2, each peak is of equal amplitude (voltage). In practice, the amplitudes will tend to vary, and their relative values are indicative of optical power carried on that channel. In addition, measuring the voltages near the corresponding peaks permits one to determine optical signal-to-noise ratio for each channel.

The drive voltage 120 and filtered input optical signal voltage alone however, fail to provide any calibration, so that the relative measurements do not provide sufficient information about the absolute wavelength of the measured channel frequencies.

In order to provide a calibration for the photodetector 117A output, a reference source 122 is used. As one can see in FIG. 1, the reference optical source 122 illuminates a reference gas cell 124. The reference optical source provides a broadband optical reference beam of light. The term broadband means that it is at least as broad as the wavelength range of interest, $\lambda_1 \ldots \lambda_n$, in order to ensure that all channels within that range can be calibrated. The switch 114 can be used to change over between measurements of the input optical signal and calibration measurements.

The light from the broadband source 122 is transmitted through the reference gas cell 124. The reference gas cell 124 contains a gas having a plurality of absorption bands or absorption lines each having a known wavelength $g_1 \ldots g_m$. At each absorption line, the reference signal is attenuated as the reference gas absorbs light energy from the reference signal. Examples of appropriate reference gases include hydrogen cyanide or acetylene. However, the gas selected may be any gas having several, closely spaced absorption lines.

After the reference light beam passes through the reference gas cell 124, it reaches the filter 112. As with the input signal, the filter 112 is scanned through the wavelength range and the resulting filtered reference light, containing wavelengths in the C-band in this example, is detected by the photodetector 117A. The photodetector 117A outputs a voltage that is used to produce a reference trace which is correlated to the control voltage, just as was done with the input optical signal. The bottom trace 204 of FIG. 2 shows such a reference trace.

The output from the photodetector 112 from a calibration run provides a scale to determine the absolute wavelengths as long as little time passes between the calibration and measurement runs. That is, for a given control voltage, the wavelength of light measured during monitoring of the optical signal from the transmission line 106 should be substantially the same as the wavelength of light measured from the reference source 122.

One can use the data points determined from the measurement of the reference signal and the known reference gas absorption line wavelengths to generate a voltage to wavelength calibration curve for the filter 112 by correlating control voltage 120 of the filter 112 to passband wavelength. Since each detected peak corresponds to the wavelength of a known absorption line, each peak's absolute wavelength is determined. Data from the input optical signal may then be matched against the calibration curve, showing the wavelengths of the detected channels. That is, the relative measurements made of the detected channels may be converted to absolute measurements by comparison to the calibration curve. The absorption line wavelengths are substantially independent of ambient temperature variations. On the other hand, the measured voltages are typically neither linearly dependent on wavelength, nor constant in time. Therefore, correlating a calibration trace with a measurement trace permits one to obtain absolute wavelength measurement, independent of time and temperature. The calibration cycles may be repeated as deemed necessary, based on the desired accuracy and the particular drift characteristics of the tunable optical bandpass filter and the photodetector 117A.

As may be apparent, no actual generation of a calibration curve is necessary. Instead, a wavelength of each measured channel can be determined relative to the measured voltages of the reference gas absorption lines.

For example, $v_1$ indicated in the control voltage trace 200 correlates to a position $a_1$ in the photodetector trace 202. The peak at $a_1$ indicates that an active channel is present in the input signal at a wavelength which corresponds to the passband, for example the C band, of the band pass filter at the voltage $v_1$. The voltage $v_1$ likewise corresponds to approximately $g_3$, a position of one of the absorption lines of the reference gas. Since the absorption lines of the gas are already known, the wavelength to which $v_1$ correlates may be determined relative to absorption line $g_3$, or by interpolation if it is between absorption lines. If there are sufficient absorption lines in the relevant wavelength range, the measured channel wavelengths may be determined to a sufficient resolution without the use of any calibration curve.

Generation of a calibration curve could be accomplished, for example, by a piecewise continuous linear curve between the known points $v_1, g_1 \ldots v_n, g_n$, by calculation of a best fit curve, or other selected methods.

Since the absorption properties of the reference gas are relatively independent of temperature and other physical parameters (such as strain on the optical fiber connecting the reference gas cell with the rest of the system), the measurement can be quite reliable.

In the case of a scanning Fabry-Perot filter, the voltage response of the filter 112 will tend to vary with time and is not generally linear with voltage. As a result, it is beneficial to produce new calibration curves periodically rather than relying on a single, one-time calibration measurement. Recalibration may be performed as required or desired, depending on accuracy requirements and drift characteristics of the filter 112. The sweep time can be adjusted, if desired. A sweep time of 125 milliseconds is an example found to be suitable.

Another possibility, which may be available depending on device response times and switching speeds, is to alternately sample from the reference source 122 and the input optical signal. By rapidly switching the switch 114, the calibration curve may be generated essentially simultaneously with the generation of the measurement curve.

This calibration can be extended to additional passbands to allow for additional calibrated wavelength range and therefore enhanced calibration. For example if the previous calibration is performed in the C-band the adjacent L-band can be simultaneously scanned if the free spectral range of filter 112 is appropriately selected. Indeed, if the free spectral range of filter 112 is selected to be larger than the C-band, a full scan of the free spectral range will result in a scan in the L-band. That is, when the m th order passband scans the C-band the m−1 th order passband scans the L-band. A mathematical relationship can be determined for two successive orders m and m−1 knowing that the gap distance of a Scanning Fabry Perot Filter (SFPF) cavity determines the passband center wavelengths according to the following equation:

$$m\lambda_m/2n=d$$

where d is the physical length of the cavity, n is the refractive index of the gap, m is the order and $\lambda_m$ is the wavelength transmitted at the m th order (m is an integer number greater than 1).

In order to extend the voltage to a wavelength calibration curve determined for the mth order to the next passband of longer wavelength, a conversion from $\lambda_m$ to $\lambda_{m-1}$ is necessary. Knowing that the distance d is the same for $\lambda_m$ and $\lambda_{m-1}$ one can write the following equation:

$$m\lambda_m/2n=(m-1)\lambda_{m-1}/2n$$

Which can be simplified to:

$$\lambda_{m-1}=(m/m-1)\lambda_m$$

This equation is used to correlate the function voltage-wavelength determined in the first calibration for the C-band with the function voltage-wavelength for the L-band. In this way, calibration is achieved for both bands. When a full scan of the free spectral range of filter 112 is performed the C-band spectrum is measured at photodetector 117A and the L-band spectrum is measured at photodetector 117B simultaneously. This is accomplished by band splitter 118 which routes the incoming optical signal passing through filter 112 depending on the wavelength of the optical signal. If the signal filtered by filter 112 is in C-band wavelength range, the signal is routed to detector 117A. If the signal filtered by filter 112 is in L-band wavelength range, the signal is routed to detector 117B. Band splitter 118 can be, for example, a wavelength dependent splitter.

In the case where the calibration for the transmission optical signal in 104, for example in the L-band, can not be performed directly, this method allows extending the calibration by using the above wavelength relationship. This situation may occur when the references that cover an alternative wavelength range may be more accurate or less expensive to generate than what is available in the actual wavelengths in the transmission signal.

In the case where direct calibration is possible in both passbands, for example in the C-band and L-band, this method is still useful since it allows a better coverage of wavelength passbands, therefore improving accuracy of the calibration. Indeed, the availability of two sets of voltage-wavelength data, one in the C-band and the other one in the L-band allows for improved accuracy in the determination of the relationship between $\lambda_m$ and $\lambda_{m-1}$. By using a polynomial or any other type of mathematical function fit, the measured voltage-wavelength data can be fitted to determine the relationship between $\lambda_m$ and $\lambda_{m-1}$ and thus providing a calibration with increased accuracy.

In another embodiment, the variation of temperature and thus fluctuations in the wavelengths of the filter are taken into account by repeating the calibration described above at several different temperatures. A set of curve fits or data points is generated. Each curve fit characterizing the wavelength-voltage function at a given temperature. Therefore, it can be possible during operation of the optical channel monitor, and by monitoring the temperature around the filter, to select the corresponding wavelength-voltage relationship at that temperature. The temperature in the filter is for example measured by temperature sensor 121 represented schematically in FIG. 1. The temperature sensor may be a thermocouple or a semiconductor device, for example. This method allows not only calibrating the wavelength-voltage relationship but calibrating the wavelength-temperature relationship as well.

Figure 3:
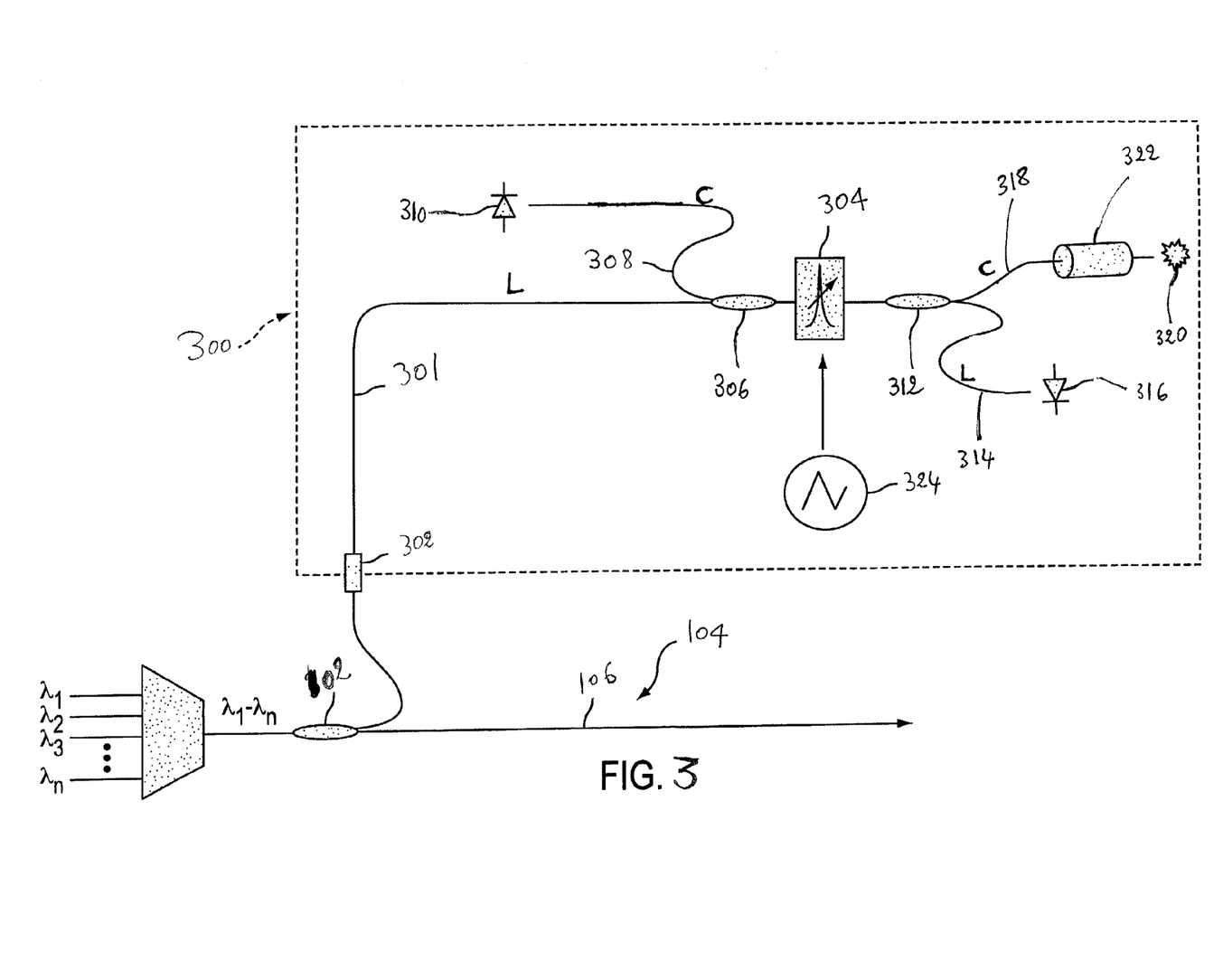
FIG. 3 is a schematic representation of an optical channel monitor according to an alternative embodiment of the present invention.

A device according to another embodiment of the present invention is illustrated in FIG. 3. An optical channel monitor 300 according to this embodiment is in optical communication with an optical communication system 104, as described above, in relation to a first embodiment of this invention. As in the device of FIG. 1, a plurality of optical signals having wavelengths $\lambda_1 \ldots \lambda_n$ are combined to form an optical signal including a plurality of channels $ch_1 \ldots ch_n$.

The optical communication system 104 has an optical fiber 106 through which the combined optical signal is transmitted. A coupler 102 redirects a portion of the energy from the optical fiber 106 into the optical channel monitor 300. The optical channel monitor 300 has an optical path 301, which is as described in reference to the first embodiment above, between the optical input port 302 and a multibandpass optical filter 304. A band splitter 306 optically connects the multibandpass optical filter 304 with detection arm 308. At the end of detection arm 308 is disposed a photodetector 310.

On the opposite side of the bandpass optical filter 304, another band coupler 312 optically connects the bandpass optical filter 304 with a detection arm 314, which includes photodetector 316, and with a reference input arm 318 which includes light source 320 and reference gas cell 322.

Band splitter 306 and band splitter 312 route optical signals depending on their wavelengths and the direction of travel.

The multibandpass optical filter 304 allows a selected wavelength band from the optical signal to pass through to be detected by the photodetector 316. As with the device shown in FIG. 1, the bandpass optical filter 304 may be tuned, for example, by the application of a control signal, which may be, for example, a ramp or triangle wave, such as is produced by the oscillator 324.

The reference light from the broadband optical source 320 passes through reference cell 322 traveling in the opposite direction of incoming light from the optical input port 302. The reference light passes through filter 304 to be detected and measured by photodetector 310. Therefore, at any given time the reference light and the input signal will be traveling in either direction from the filter, one nominally from the input and towards the photodetector 316 and the other nominally from the reference source towards the photodetector 310.

The incoming light entering the optical channel monitor through port 302 can be any of various pass-bands available in optical communication. Such pass-bands include C-band, L-band and S-band. In the remainder of the description, for the purpose of illustration and not limitation, we suppose that the incoming signal is comprised of L-band wavelengths.

The incoming optical signal comprised of L-band wavelengths passes through optical coupler 306, which acts as a first band splitter, and further passes through optical filter 304. The optical signal exiting optical filter 304 enters optical coupler 312, which acts as a second band splitter. The second band splitter 312 directs the light from the optical communication system 104 to photodetector 316.

The reference source 320 comprises wavelengths in the C-band. As mentioned previously, the light from the reference source takes the opposite path through optical filter 304. When optical filter 304 is tuned to the reference C-band the light passes through optical filter 304 and reaches photodetector 310.

Similar to the first embodiment of the present invention, if the free spectral range of filter 304 is selected to be larger than the C-band, a full scan of the free spectral range will result in a scan in the L-band. That is, when the m th order passband scans the C-band the m−1 th order passband scans the L-band. A mathematical relationship can be determined for two successive orders m and m−1 knowing that the gap distance of a Scanning Fabry Perot Filter (SFPF) cavity determines the passband center wavelengths according to the following equation:

$$m\lambda_m/2n=d$$

where d is the physical length of the cavity, n is the refractive index of the gap, m is the order and $\lambda_m$ is the wavelength transmitted at the m th order (m is an integer number greater than 1). The relationship between $\lambda_m$ and $\lambda_{m-1}$ is determined to be:

$$\lambda_{m-1}=(m/m-1)\lambda_m$$

This equation is used to correlate the function wavelength-voltage determined in the calibration for the C-band with the function voltage-wavelength for the L-band.

Alternatively, if the observed filter response differs from the theoretical equation above, a polynomial or other mathematical function can be used to fit the measured data and thus determine the relationship between $\lambda_m$ and $\lambda_{m-1}$. Similar to the first embodiment, the optical channel monitor can be also calibrated in temperature thus giving an additional control over temperature fluctuation during optical channel monitor operation.

In this way, calibration is achieved for both bands. When a full scan of the free spectral range of filter 304 is performed the C-band spectrum is measured at photodetector 310 and the L-band spectrum is measured at photodetector 316 simultaneously. Therefore, measurement and calibration is performed during the same scan thus substantially eliminating any error that might be introduced by scan-to scan differences in the Scanning Fabry-Perot Filter's transfer function.

Figure 4:
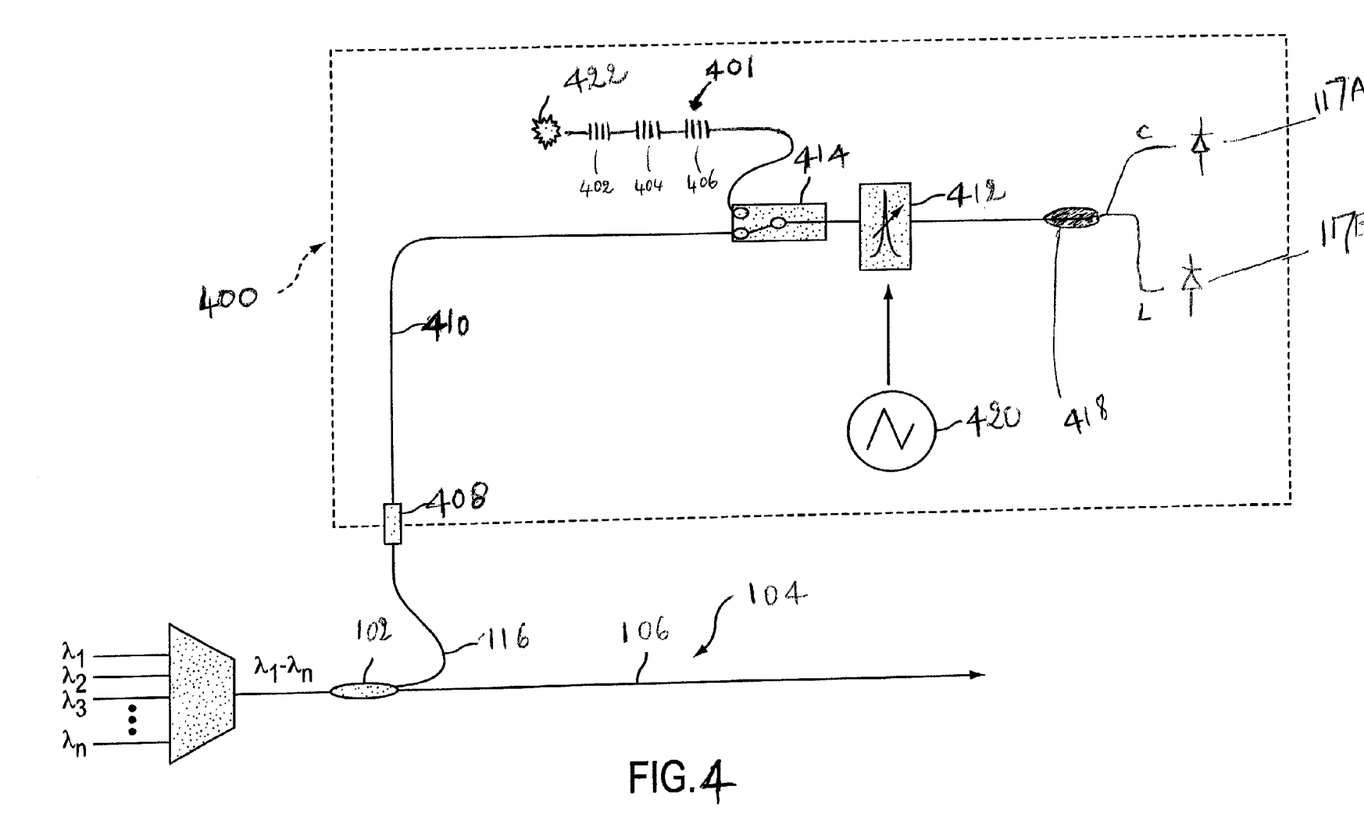
FIG. 4 is a schematic representation of an optical channel monitor, showing the use of fiber Bragg gratings, according to an embodiment of the present invention.

FIG. 4 shows a portion of a WDM system that includes an optical channel monitor 400 according to another embodiment of the present invention. Similarly as described in the embodiment illustrated in FIG. 1, the optical channel monitor 400 is in optical communication with an optical communication system 104 that is adapted to carry optical signals modulated on a carrier of at least one carrier wavelength. More generally, the optical communication system 104 transmits a plurality of channels $ch_1 \ldots ch_n$ at corresponding wavelengths $\lambda_1 \ldots \lambda_n$ which are combined to form the WDM optical signal. Though in practice a channel will generally have a width, and thus occupy a wavelength range rather than a specific wavelength, for the purposes of this description, each channel will be referred to in terms of a single wavelength. The wavelength of a channel may be considered to be a central wavelength of a range, or any selected wavelength within the range occupied by the channel.

The optical communication system 104 has an optical fiber 106, that carries the WDM signal, which in long-haul WDM systems will generally be a single mode optical fiber. A coupler 102 redirects a portion of the energy from the optical fiber 106 into the optical channel monitor 100 through optical input 108 to provide an input optical signal of the optical channel monitor 100.

A tap coupler or splitter are suitable to use for the coupler 102. 1%–5% of the signal is adequate, though more, or less, light may be diverted if desired.

The optical channel monitor 400 has an optical path 410 between the optical input 408 and a multibandpass optical filter 412 that is intercepted by a switch 414. An optical fiber having an end spliced to another optical fiber 116 is suitable for providing an optical input 408 and an optical path 410 to the optical filter 412 through switch 414. Other optical paths 410 and optical inputs 408 may include non-fiber waveguides or free space arrangements of optical components such as mirrors and/or prisms and lenses, without departing from the general scope of the invention.

The optical filter 412 allows a selected wavelength band from the input optical signal to pass through. In the embodiment illustrated in FIG. 4, the optical filter 412 is a scanning tunable optical filter. For example, a scanning Fabry-Perot filter is suitable. The filtered optical signal is detected by either of the photodetectors 117A or 117B.

The tunable optical filter 412 may be tuned by providing an electromechanical system to vary the spacing between the reflecting surfaces of a Fabry-Perot resonator. The optical filter 412, capable of scanning multiple pass bands, is scanned over a wavelength range of interest, for example, over a range of frequencies that spans all anticipated optical wavelength channels used by the optical communication system 104.

Within the total wavelength range over which the passbands of the filter 412 is scanned there may be several wavelength bands which do not overlap with any of the channels $ch_1$ to $ch_n$. Likewise, there may be one or more of the channels which is not active at a given moment. For example, the filter 412 may be used to scan one or two passbands to monitor any of two adjacent bands among the three bands C, L and S. One of the two adjacent bands scanned may or may not be present in the optical system 104.

The optical channel monitor 400 may include band splitter 418 to separate two passbands scanned by filter 412. Each of the two passbands may then be independently detected by photodetector 117A or 117B. For example detector 117A may detect wavelengths in the C band while detector 117B may detect the L band. This optical channel monitor 400 may also have a single photodetector, e.g. 117B, and no band splitter 118, to operate in "single band" mode.

When the optical filter 412 is tuned to a wavelength band, for example in the C band, that overlaps with an active channel, the photodetector 117A will produce an output signal indicating the strength of the light detected. As the filter is scanned across a wavelength range in the C band, the photodetector 117A output will indicate a peak at the wavelength of the active channel.

In order to ensure that only a single channel in a band region is monitored at a time, the passband width of the optical filter 412 should be more narrow than the bandwidth between channels and broad enough to detect the channel. At current levels of system performance, a bandwidth of about 20 pm to about 200 pm is appropriate. As systems become more densely packed with channels, the bandwidth of the optical filter 412 should be selected accordingly.

In order to provide a calibration for the photodetector 117A output, for example, a reference source 422 is used. As one can see in FIG. 4, the light from reference optical source 422 propagates through a plurality of fiber Bragg gratings 401 disposed in line between reference source 422 and optical switch 414. The reference optical source 422 provides a broadband optical reference beam of light. The term broadband means that it is at least as broad as the wavelength range of interest, $\lambda_1 \ldots \lambda_n$, in order to ensure that all channels within that range can be calibrated. The switch 414 can be used to change over between measurements of the input optical signal and calibration measurements.

The light from the broadband source 422 is transmitted through the plurality of fiber Bragg gratings 401. The plurality of fiber Bragg gratings (FBGs) 401 comprises for example FBG 402, FBG 404 and FBG 406. In the present embodiment three FBGs are illustrated, however, it is understood that more than three FBGs can be incorporated therein. The light in broadband source 422 comprises a plurality of wavelengths. Each FBG 402, 404 and 406 is tuned to select only one narrow wavelength band. The word "select" meaning that the selected narrow wavelength band is reflected and therefore would appear as a dip in the spectrum of light. For example FBG 402 is tuned to select wavelength w1, FBG 404 is tuned to select w2 and FBG 406 is tuned to select w3 analogous to the gas cell described in the previous embodiment which absorbs known wavelengths $g_1 \ldots g_n$. Due to fluctuations in temperature, each FBG needs to be controlled to select a specific wavelength at anytime. Therefore, a temperature sensor is incorporated into each of the FBGs or the array, to monitor the temperature and thus permit one to provide feedback to compensate for any variation in temperature.

After the reference light beam passes through the plurality of fiber Bragg gratings 401, it reaches the filter 412. As with the input signal, the filter 412 is scanned through the wavelength range and the resulting filtered reference light, containing wavelengths in the C-band, for this example, is detected by the photodetector 117A. The photodetector 117A outputs a voltage that is used to produce a reference trace which is correlated to the control voltage, just as was done with the input optical signal and the similar fashion as was described in the embodiment illustrated in FIG. 1. One can use the data points determined from the measurement of the reference signal and the known wavelengths selected by the plurality of fiber Bragg gratings 401 to generate a voltage to wavelength calibration curve for the filter 412 by correlating control voltage 420 of the filter 412 to passband wavelength. The calibration of the detectors 117A or 117B is performed in the same manner described in the previous embodiment illustrated in FIG. 1. The calibration can be performed in one wavelength band or as described previously extended to two bands.

Figure 5:
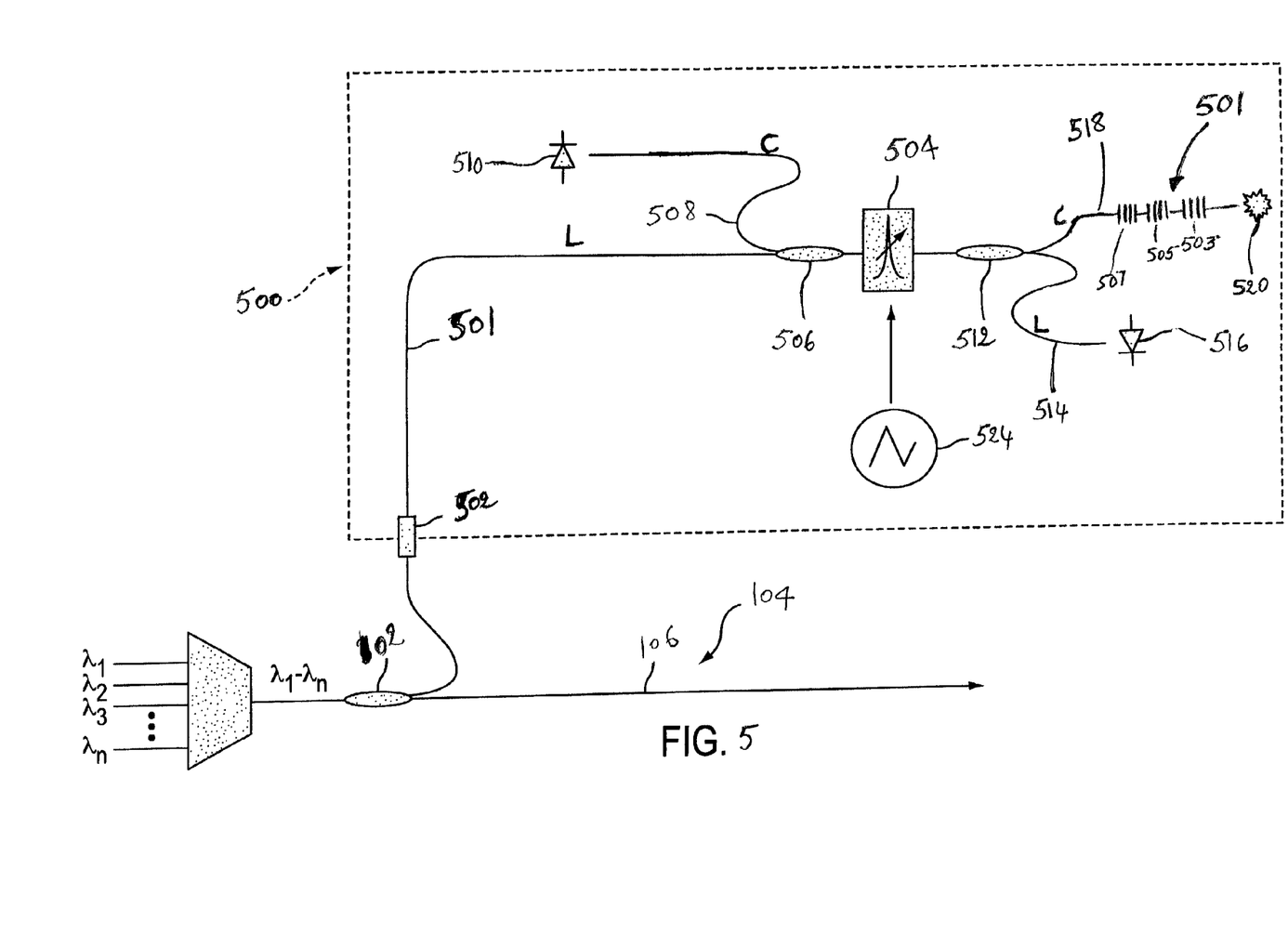
FIG. 5 is schematic representation of an optical channel monitor, showing the use of fiber Bragg gratings, according to another embodiment of the present invention.

A device according to another embodiment of the present invention is illustrated in FIG. 5. An optical channel monitor 500 according to this embodiment is in optical communication with an optical communication system 104, as described above, in relation to a first embodiment of this invention. As in the device of FIG. 3 a plurality of optical signals having wavelengths $\lambda_1 \ldots \lambda_n$ are combined to form an optical signal including a plurality of channels $ch_1 \ldots ch_n$.

The optical communication system 104 has an optical fiber 106 through which the combined optical signal is transmitted. A coupler 502 redirects a portion of the energy from the optical fiber 106 into the optical channel monitor 500. The optical channel monitor 500 has an optical path 501, which is as described in reference to the first embodiment above, between the optical input port 502 and optical filter 504. A band splitter 506 optically connects the optical filter 504 with detection arm 508. At the end of detection arm 508 is disposed a photodetector 510.

On the opposite side of the bandpass optical filter 504, another band splitter 512 optically connects the bandpass optical filter 504 with a detection arm 514, which includes photodetector 516, and with a reference input arm 518 which includes light source 520 and a series of fiber Bragg gratings (FBGs) 501.

Band splitter 506 and band splitter 512 route optical signals depending on their wavelengths and the direction of travel.

The optical filter 504 allows a selected wavelength band from the optical signal to pass through to be detected by the photodetector 516. As with the device shown in FIG. 3, the bandpass optical filter 504 may be tuned, for example, by the application of a control signal, which may be, for example, a ramp or triangle wave, such as is produced by the oscillator 524.

The reference light from the broadband optical source 520 passes through a plurality of fiber Bragg gratings (FBGs) 501 traveling in the opposite direction of incoming light from the optical input port 502. In the same manner described previously for the embodiment illustrated on FIG. 4, the reference light passes through a series of fiber Bragg gratings FBG 503, FBG 505 and FBG 507. The wavelengths selected by each FBG is tightly controlled to give an accurate reference of wavelengths for calibrating filter 504. The light output by the plurality of FBGs 501 is detected and measured by photodetector 510. Therefore, at any given time the reference light and the input signal will be traveling in either direction from the filter, one nominally from the input and towards the photodetector 516 and the other nominally from the reference source towards the photodetector 510.

The incoming light entering the optical channel monitor through port 502 can be any of various pass-bands available in optical communication. Such pass-bands include C-band, L-band and S-band. In the remainder of the description, for the purpose of illustration and not limitation, we suppose that the incoming signal is comprised of L-band wavelengths.

The incoming optical signal comprised of L-band wavelengths passes through optical coupler 506, which acts as a first band splitter, and further passes through optical filter 504. The optical signal exiting optical filter 504 enters optical coupler 512, which acts as a second band splitter. The second band splitter 512 directs the light from the optical communication system 104 to photodetector 516.

The reference source 520 comprises wavelengths in the C-band. As mentioned previously, the light from the reference source takes the opposite path through optical filter 504. When optical filter 504 is tuned to the reference C-band the light passes through optical filter 504 and reaches photodetector 510.

The optical channel monitor may also be modular in design to allow interchanging and replacing subcomponents. For example, anyone or each of the above embodiments of the optical channel monitor may be modular in design. The optical filters may be independently removable and replaceable, or the reference sources may be removable and replaceable, for example. This allows for one to easily repair and/or reconfigure the optical channel monitor.

Figure 6:
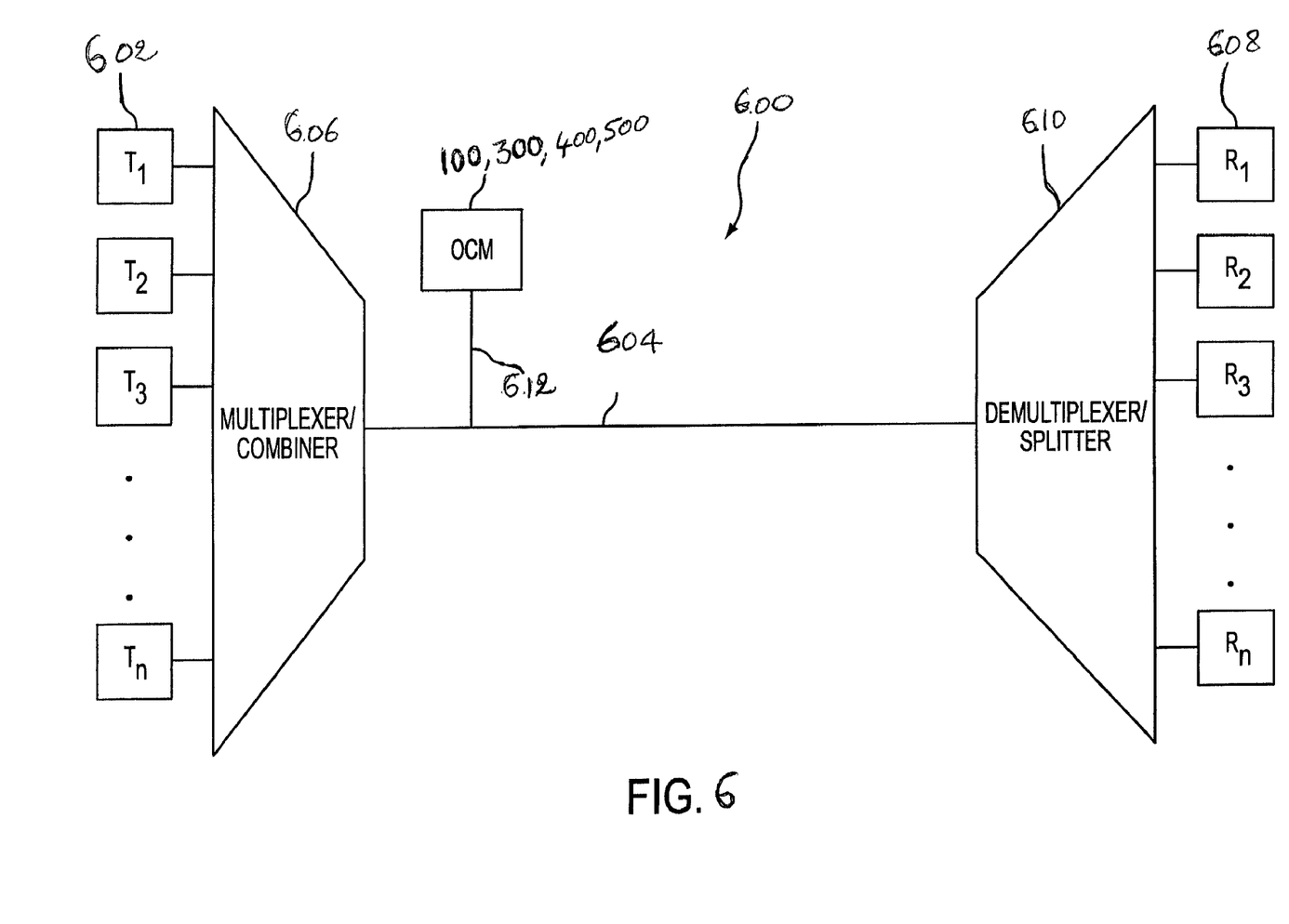
FIG. 6 is a schematic representation of an optical communication system incorporating an optical channel monitor according to an embodiment of the present invention.

FIG. 6 shows generally an optical communication system 600 incorporating an optical channel monitor 100, 300, 400, 500 according to the present invention. A transmitter 602, which may be understood to be alternately a single transmitter, an array of transmitters or a tunable transmitting arrangement, produces an optical signal which is coupled into an optical transmission line 604. A multiplexer or combiner 606 may be used to couple signals from multiple transmitters 602 into a single optical transmission line 404. The optical signal includes at least one channel and will commonly include several channels. A receiver 608 is also in optical communication with the transmission line 604 and receives the optical signal. A splitter, demultiplexer or channel selector 610 may be used to couple the optical signal into the receiver 608 from the transmission line 604.

An optical input 612 of the optical channel monitor 100, 300, 400, 500 is in communication with the transmission line 604. The optical input 612 may be any device for coupling a portion of the transmitted optical signal into the optical channel monitor 100, 300, 400, 500. The optical channel monitor 100, as described above, includes a tunable optical bandpass filter 112 in communication with the optical input 108. Photodetectors 117A and 117B, reference light source 122, reference gas cell 124 or alternatively a plurality of FBGs 401, optical switch 114, and a band splitter 118 are included in the channel monitor 100 to allow monitoring of the optical signal and calibration of the monitoring as described above in the first embodiment of the invention. The optical channel monitor 300, as described above, includes a tunable optical bandpass filter 304 in communication with the optical input 302. Photodetectors 310 and 316, reference light source 320, reference gas cell 322 or alternatively a plurality of FBGs 501, optical band splitters 306 and 312 are included in the channel monitor 300 to allow monitoring of the optical signal and calibration of the monitoring as described above in the second embodiment of the invention.

The optical channel monitors 100, 300, 400, 500 can be used in a variety of ways in accordance with this aspect of the invention.

Figure 7:
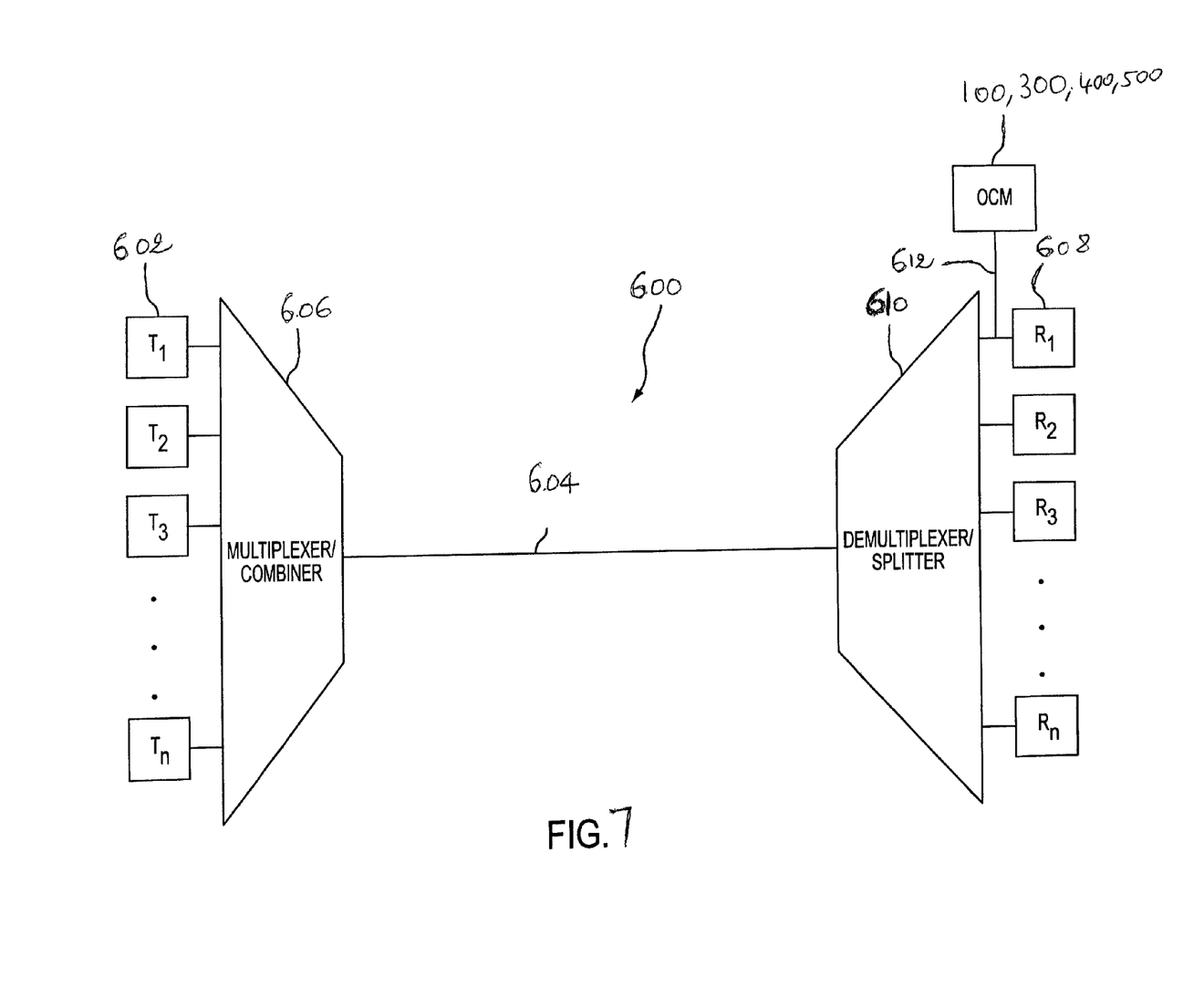
FIG. 7 is a schematic representation of an optical communication system incorporating an optical channel monitor according to another embodiment of the present invention.

In a first usage, as shown in FIG. 6, a channel monitor 100, 300, 400, 500 receives light from a transmitter in order to monitor the transmitted channels in the communication system 600. Though shown coupled to the transmission line 604, the channel monitor 100, 300, 400, 500 may similarly be coupled to the transmitter prior to the multiplexer 606. Alternately, the channel monitor 100, 300, 400, 500 receives light prior to a receiver 608 to monitor incoming light as shown in FIG. 7. For instance, in a system using channel selectors to send only a single channel to the receiver 608, the channel monitor 100, 300, 400, 500 is used to ensure that the channel selector maintains its proper tuning such that the appropriate channel is selected.

Though the invention has been described in terms of multiple channels being transmitted along a single fiber, one skilled in the art will realize that it has application in systems in which only a single channel is transmitted on the fiber. Likewise, though the invention has been described in the context of 1550 nm transmission systems, it may be applied to 1310 nm systems, for example, or other selected wavelength systems.

While the invention has been described in connection with particular embodiments, it is to be understood that the invention is not limited to the disclosed embodiments, but on the contrary it is intended to cover various modifications and equivalent arrangements included within the spirit and scope of the invention as defined by the claims, which follow.

We claim:

1. An optical channel monitor, comprising:
   an optical input port;
   a photodetector disposed in an optical path communicating at least intermittently with said optical input port;
   an optical filter disposed in said optical path between said optical input port and said photodetector;
   an optical band splitter disposed in said optical path between said optical filter and said photodetector;
   an optical reference system in optical communication with the optical band splitter between said photodetector and said optical filter and configured to generate a reference signal; and
   a comparison device configured to compare a measurement signal with said reference signal by generating a first wavelength-to-voltage function for the reference signal and generating a second wavelength-to-voltage function for the measurement signal, wherein
   said second wavelength-to-voltage function is generated using a wavelength transform function consisting of relating the wavelengths in the reference optical signal with the wavelengths in the measurement signal with the following equation: $\lambda_{m-1}=(m/m-1)\lambda_m$ where m and m−1 represent the order of the wavelength passband, m being an integer number greater than 1, $\lambda_m$ and $\lambda\text{-}1_m$ are wavelengths transmitted at the $m^{th}$ and $m-1^{th}$ order respectively.

2. An optical channel monitor according to claim 1, wherein said optical filter is a multibandpass filter.

3. An optical channel monitor according to claim 2, wherein said multibandpass filter is a scanning Fabry-Perot filter.

4. An optical channel monitor according to claim 3, further comprising a Fabry-Perot drive source.

5. An optical channel monitor according to claim 4, wherein said drive source comprises an electrical oscillator.

6. An optical channel monitor according to claim 5, wherein said electrical oscillator generates a triangular electrical signal.

7. An optical channel monitor according to claim 1, further comprising a second photodetector in optical communication with said optical band splitter, wherein said optical band splitter directs light received in one wavelength band to the first mentioned photodetector and directs light received in a second wavelength band to said second photodetector.

8. An optical channel monitor according to claim 7, further comprising an optical switch disposed in said optical path between said optical filter and said optical input port.

9. An optical channel monitor according to claim 8, wherein said optical switch is constructed and arranged to selectively break and close said optical path between said optical input port and said optical filter, and to break and close a reference optical path between said optical reference system and said optical filter.

10. An optical channel monitor according to claim 1, wherein said optical reference system comprises a broadband optical source and a reference gas cell.

11. An optical channel monitor according to claim 10, wherein said gas cell comprises a reference gas selected from the group comprising hydrogen cyanide and acetylene.

12. An optical channel monitor according to claim 1, wherein said optical reference system comprises a broadband optical source and a plurality of fiber Bragg gratings arranged in series.

13. An optical channel monitor according to claim 1, further comprising a second optical band splitter disposed in said optical path between said optical input port and said optical filter.

14. An optical channel monitor according to claim 13, further comprising a second photodetector in optical communication with said second optical band splitter.

15. An optical channel monitor according to claim 14, wherein said band splitters direct light to separate photodetectors depending on a wavelength of light incident thereon.

16. An optical channel monitor according to claim 13, wherein said optical filter is a scanning Fabry-Perot filter.

17. An optical channel monitor according to claim 16, further comprising a filter drive source.

18. An optical channel monitor according to claim 17, wherein said drive source comprises an electrical oscillator.

19. An optical channel monitor according to claim 18, wherein said electrical oscillator generates a triangular electrical signal.

20. The optical channel monitor of claim 1, wherein said comparison device is further configured to iteratively compare said measurement signal with said reference signal over a plurality of temperatures.

21. A method of measuring characteristics of an optical signal, comprising:
    filtering a reference beam of light with a tunable multibandpass filter;
    redirecting portions of said filtered reference beam of light to a first photodetector to produce a reference signal;
    filtering at least a portion of an optical signal with said tunable multibandpass filter;
    redirecting portions of said filtered portion of said optical signal to a second photodetector to produce a measurement signal; and
    determining characteristics of said measurement signal based on a comparison with said reference signal, wherein
    said comparison of said measurement signal with said reference signal comprises generating a first wavelength-to-voltage function for the reference signal and generating a second wavelength-to-voltage function for the measurement signal, and
    said second wavelength-to-voltage function is generated using a wavelength transform function consisting of relating the wavelengths in the reference optical signal with the wavelengths in the measurement signal with the following equation: $\lambda_{m-1}=(m/m-1)\lambda_m$ where m and m−1 represent the order of the wavelength passband, m being an integer number greater than 1, $\lambda_m$ and $\lambda-1_m$ are wavelengths transmitted at the $m^{th}$ and m−$1^{th}$ order respectively.

22. A method of measuring characteristics of an optical signal according to claim 21, wherein said filtering a reference beam of light comprises scanning said tunable multibandpass filter over a wavelength range.

23. A method of measuring characteristics of an optical signal according to claim 21, wherein said filtering at least a portion of an optical signal comprises scanning said tunable multibandpass filter over said wavelength range.

24. A method of measuring characteristics of an optical signal according to claim 21, wherein wavelength $\lambda_m$ is a wavelength selected from wavelengths in the reference optical signal and $\lambda_{m-1}$ is a wavelength selected from wavelengths in the measurement signal.

25. A method of measuring characteristics of an optical signal according to claim 21, further comprising:
    determining a temperature of said multibandpass filter during said filtering a reference beam of light; and
    determining a temperature of said multibandpass filter during said filtering at least a portion of said optical signal.

26. An optical channel monitor, comprising:
    an optical input port;
    a photodetector disposed in an optical path communicating at least intermittently with said optical input port;
    an optical filter disposed in said optical path between said optical input port and said photodetector;
    an optical switch disposed in said optical path between said optical filter and said optical input port;
    an optical reference system in optical communication with said optical switch, said optical reference system comprising a broadband optical source and a plurality of fiber Bragg gratings disposed between said broadband source and said optical switch; and
    a comparison device configured to compare a measurement signal with a reference signal by generating a first wavelength-to-voltage function for the reference signal and generating a second wavelength-to-voltage function for the measurement signal, wherein
    said second wavelength-to-voltage function is generated using a wavelength transform function consisting of relating the wavelengths in the reference optical signal with the wavelengths in the measurement signal with the following equation: $\lambda_{m-1}=(m/m-1)\lambda_m$ where m and m−1 represent the order of the wavelength passband, m being an integer number greater than 1, $\lambda_m$ and $\lambda-1_m$ are wavelengths transmitted at the $m^{th}$ and m−$1^{th}$ order respectively.

27. An optical channel monitor according to claim 26 further comprising: an optical band splitter disposed in said optical path between said optical filter and said photodetector.

28. An optical channel monitor according to claim 26, wherein said plurality of fiber Bragg gratings are temperature monitored by temperature sensors.

29. The optical channel monitor of claim 26, wherein said comparison device is further configured to iteratively compare said measurement signal with said reference signal over a plurality of temperatures.

30. A method of measuring characteristics of an optical signal, comprising:
    filtering a reference beam of light with a tunable multibandpass filter;
    redirecting portions of said filtered reference beam of light to each of first and second photodetectors according to wavelengths of said portions of filtered reference light to produce first and second reference signals;

filtering at least a portion of an optical signal with said tunable multibandpass filter;

redirecting portions of said filtered portion of said optical signal to each of said first and second photodetectors to produce first and second measurement signals; and determining characteristics of said first and second measurement signals based on comparison of said first and second reference, wherein said comparison comprises generating a first wavelength-to-voltage function for the first reference signal and generating a second wavelength-to-voltage function for the second reference signal, and said second wavelength-to-voltage function is generated using a wavelength transform function consisting of relating the wavelengths in the reference optical signal with the wavelengths in the second reference signal with the following equation: $\lambda_{m-1}=(m/m-1)\lambda_m$ where m and m−1 represent the order of the wavelength passband, m being an integer number greater than 1, $\lambda_m$ and $\lambda-1_m$ are wavelengths transmitted at the $m^{th}$ and $m-1^{th}$ order respectively.

31. The method of claim 30, wherein said comparison further comprises iteratively comparing said measurement signal with said reference signal over a plurality of temperatures.

32. A method of measuring characteristics of an optical signal, comprising:

filtering at least a portion of an optical signal with an optical filter having a first passband substantially equal in wavelength to a wavelength of said optical signal and a second passband at a wavelength different from said optical signal;

detecting said filtered portion of said optical signal to generate a measurement signal; filtering a reference light beam with said optical filter, said reference light beam having light of a wavelength within said second passband of said optical filter;

detecting said filtered reference light beam after it has passed through said optical filter at said second passband to generate a reference signal; and determining a characteristic of said optical signal based on a comparison of said measurement signal to said reference signal, wherein said comparison of said measurement signal with said reference signal comprises generating a first wavelength-to-voltage function for the reference signal and generating a second wavelength-to-voltage function for the measurement signal, and said second wavelength-to-voltage function is generated using a wavelength transform function consisting of relating the wavelengths in the reference optical signal with the wavelengths in the measurement signal with the following equation: $\lambda_{m-1}=(m/m-1)\lambda_m$ where m and m−1 represent the order of the wavelength passband, m being an integer number greater than 1, $\lambda_m$ and $\lambda-1_m$ are wavelengths transmitted at the $m^{th}$ and $m-1^{th}$ respectively.

33. The method of claim 32, wherein said comparison further comprises iteratively comparing said measurement signal with said reference signal over a plurality of temperatures.

34. A wavelength division multiplexed optical communication system, comprising:

a plurality of transmitters; an optical multiplexer in communication with said plurality of transmitters;

an optical transmission line in communication with the optical multiplexer;

an optical demultiplexer in communication with the optical transmission line;

a plurality of receivers in communication with the optical demultiplexer; and an optical channel monitor optically coupled between said plurality of transmitters and said plurality of receivers, said optical channel monitor comprising:

an optical input port;

a photodetector disposed in an optical path communicating at least intermittently with said optical input port;

an optical filter disposed in said optical path between said optical input port and said photodetector;

an optical band splitter disposed in said optical path between said optical filter and said photodetector;

an optical reference system in optical communication with said optical switch; and a comparison device configured to compare a measurement signal with a reference signal by generating a first wavelength-to-voltage function for the reference signal and generating a second wavelength-to-voltage function for the measurement signal, wherein said second wavelength-to-voltage function is generated using a wavelength transform function consisting of relating the wavelengths in the reference optical signal with the wavelengths in the measurement signal with the following equation: $\lambda_{m-1}=(m/m-1)\lambda_m$ where m and m−1 represent the order of the wavelength passband, m being an integer number greater than 1, $\lambda_m$ and $\lambda-1_m$ are wavelengths transmitted at the $m^{th}$ and $m-1^{th}$ order respectively.

35. The wavelength division multiplexed optical communication system of claim 34, wherein said comparison device is further configured to iteratively compare said measurement signal with said reference signal over a plurality of temperatures.

* * * * *